US011907911B2

United States Patent
Kumar Agrawal et al.

(10) Patent No.: US 11,907,911 B2
(45) Date of Patent: Feb. 20, 2024

(54) METHODS AND DEVICES FOR RESOLVING AGENDA AND CALENDARING EVENT DISCREPANCIES

(71) Applicant: Motorola Mobility LLC, Chicago, IL (US)

(72) Inventors: Amit Kumar Agrawal, Bangalore (IN); Alberto R. Cavallaro, Northbrook, IL (US)

(73) Assignee: Motorola Mobility LLC, Chicago, IL (US)

(*) Notice: Subject to any disclaimer, the term of this patent is extended or adjusted under 35 U.S.C. 154(b) by 31 days.

(21) Appl. No.: 17/137,128

(22) Filed: Dec. 29, 2020

(65) Prior Publication Data

US 2022/0207487 A1 Jun. 30, 2022

(51) Int. Cl.
| | |
|---|---|
| G06Q 10/1093 | (2023.01) |
| G06F 40/134 | (2020.01) |
| G06F 40/109 | (2020.01) |
| G06F 40/205 | (2020.01) |

(52) U.S. Cl.
CPC ....... *G06Q 10/1095* (2013.01); *G06F 40/109* (2020.01); *G06F 40/134* (2020.01); *G06F 40/205* (2020.01); *G06Q 10/1093* (2013.01)

(58) Field of Classification Search
CPC . G06Q 10/1095; G06F 40/109; G06F 40/134; G06F 40/205
See application file for complete search history.

(56) References Cited

U.S. PATENT DOCUMENTS

| | | | |
|---|---|---|---|
| 5,247,438 A * | 9/1993 | Subas ................. G06Q 10/109 700/90 |
| 5,727,950 A | 3/1998 | Cook et al. | |
| 7,747,458 B2 * | 6/2010 | Lyle .................. G06Q 10/1093 705/7.19 |
| 8,346,879 B2 * | 1/2013 | Meunier ................ G06F 15/16 709/206 |
| 8,478,606 B2 * | 7/2013 | Bodlaender ............ G16H 20/60 705/2 |
| 8,494,891 B2 * | 7/2013 | Bhogal ................ G06Q 10/109 705/7.19 |
| 9,251,476 B2 * | 2/2016 | Keohane ............... G06F 3/0482 |
| 9,436,649 B2 * | 9/2016 | Meunier ................ G06F 15/16 |
| 10,942,641 B2 * | 3/2021 | Monte .................. G06F 3/0488 |
| 10,990,930 B2 * | 4/2021 | Cleaver ............. G06Q 10/1095 |

(Continued)

OTHER PUBLICATIONS

Heng Ji, Ralph Grishman, Zheng Chen, and Prashant Gupta. 2009. Cross-document Event Extraction and Tracking: Task, Evaluation, Techniques and Challenges. In Proceedings of the International Conference RANLP-2009, pp. 166-172, (Year: 2009).*

(Continued)

*Primary Examiner* — Benjamin Smith
(74) *Attorney, Agent, or Firm* — Philip H. Burrus, IV

(57) ABSTRACT

An electronic device includes a display and one or more processors operable with the display and a calendaring application. The one or more processors detect a mismatch in starting or ending times occurring between a calendaring event notification and an agenda associated with the calendaring event notification, and present a prompt upon the display identifying the mismatch when the mismatch is detected. The prompt can include at least one remediating option for correcting the mismatch.

20 Claims, 8 Drawing Sheets

(56) References Cited

U.S. PATENT DOCUMENTS

| | | | | |
|---|---|---|---|---|
| 11,036,919 | B2* | 6/2021 | Laborczfalvi | G06Q 10/1093 |
| 11,501,057 | B2* | 11/2022 | Laborczfalvi | G06Q 10/1093 |
| 2001/0049617 | A1* | 12/2001 | Berenson | G06Q 10/109 |
| | | | | 709/201 |
| 2008/0091504 | A1* | 4/2008 | Lyle | G06Q 10/109 |
| | | | | 705/7.19 |
| 2008/0177611 | A1* | 7/2008 | Sommers | G06Q 10/1095 |
| | | | | 705/7.19 |
| 2008/0306997 | A1* | 12/2008 | Keohane | G06F 3/0482 |
| 2009/0281860 | A1* | 11/2009 | Bhogal | G06Q 10/1095 |
| | | | | 705/7.19 |
| 2011/0302251 | A1* | 12/2011 | Meunier | G06Q 10/107 |
| | | | | 709/206 |
| 2012/0030194 | A1* | 2/2012 | Jain | H04M 1/72451 |
| | | | | 707/E17.141 |
| 2013/0073662 | A1* | 3/2013 | Meunier | G06F 15/16 |
| | | | | 709/206 |
| 2013/0117060 | A1* | 5/2013 | Henriksen | G06Q 10/06 |
| | | | | 705/7.21 |
| 2014/0108085 | A1* | 4/2014 | Henriksen | G06Q 10/109 |
| | | | | 705/7.19 |
| 2014/0149166 | A1* | 5/2014 | Henriksen | G06Q 10/10 |
| | | | | 705/7.19 |
| 2014/0200944 | A1* | 7/2014 | Henriksen | G06Q 10/1095 |
| | | | | 705/7.19 |
| 2016/0019506 | A1 | 1/2016 | Krishnappa et al. | |
| 2016/0259761 | A1* | 9/2016 | Laborczfalvi | G06Q 10/1093 |
| 2016/0267439 | A1* | 9/2016 | Bitran | G06Q 10/1095 |
| 2017/0024702 | A1 | 1/2017 | Agrawal | |
| 2017/0109706 | A1 | 4/2017 | Sankaran | |
| 2017/0188098 | A1* | 6/2017 | Lin | H04N 21/4882 |
| 2017/0308866 | A1* | 10/2017 | Dotan-Cohen | G06Q 10/1095 |
| 2018/0095938 | A1* | 4/2018 | Monte | G06Q 10/109 |
| 2018/0365653 | A1* | 12/2018 | Cleaver | G06Q 10/1095 |
| 2019/0156293 | A1* | 5/2019 | Kumar | G06Q 10/06314 |
| 2020/0019292 | A1* | 1/2020 | Monte | G06Q 10/109 |
| 2020/0403818 | A1* | 12/2020 | Daredia | G10L 17/00 |
| 2021/0133688 | A1* | 5/2021 | Park | H04L 51/046 |
| 2021/0192465 | A1* | 6/2021 | VanBlon | G06Q 10/1095 |
| 2021/0295238 | A1* | 9/2021 | Poon | G06Q 10/1053 |
| 2021/0326513 | A1* | 10/2021 | Laborczfalvi | G06Q 10/107 |
| 2021/0374683 | A1* | 12/2021 | Park | G06Q 10/1095 |
| 2022/0207487 | A1* | 6/2022 | Kumar Agrawal | G06F 40/109 |

OTHER PUBLICATIONS

Jannik Strötgen and Michael Gertz. 2010. HeidelTime: High Quality Rule-Based Extraction and Normalization of Temporal Expressions. In Proceedings of the 5th International Workshop on Semantic Evaluation, pp. 321-324, Uppsala, Sweden. Association for Computational Linguistics. (Year: 2010).*

Vanitha, Guda & Sanampudi, SureshKumar. (2019). Event Time Relationship in Natural Language Text. International Journal of Recent Contributions from Engineering, Science & IT (iJES). 7. 4. 10.3991/ijes.v7i3.10985. (Year: 2019).*

Merriam-Webster Online, "Agenda", Retrieved from WayBack Machine, Jul. 13, 2019; 13 pages; https://web.archive.org/web/20190713235520/https://www.merriam-webster.com/dictionary/agenda (Year: 2019).*

* cited by examiner

METHODS AND DEVICES FOR RESOLVING AGENDA AND CALENDARING EVENT DISCREPANCIES

BACKGROUND

Technical Field

This disclosure relates generally to electronic devices, and more particularly to electronic devices operable with calendaring applications.

Background Art

Mobile electronic communication devices, such as mobile telephones, smart phones, gaming devices, and the like, are used by billions of people. The owners of such devices come from all walks of life. These owners use mobile communication devices for many different purposes including, but not limited to, voice communications and data communications for text messaging, Internet browsing, commerce such as banking, and social networking. The circumstances under which users of mobile communication device use their devices varies widely as well.

Many users rely on calendaring applications operating on their personal electronic device to keep track of appointments, meetings, and personal commitments. It would be advantageous to have an improved calendaring application.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
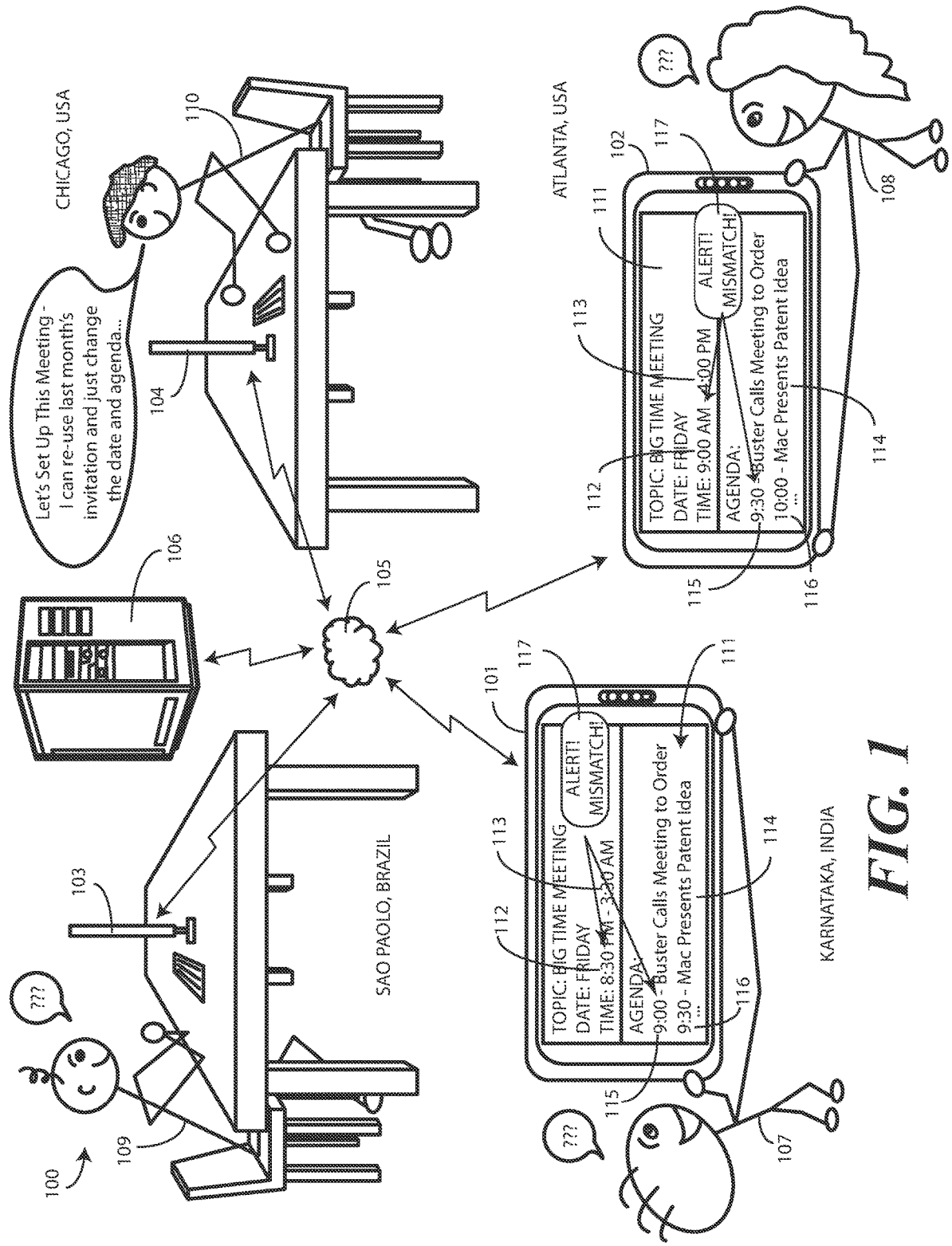
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to presenting, by one or more processors, a prompt at a user interface of an electronic device identifying a mismatch when there is a mismatch between a calendaring event bounding time and an agenda bounding time in a proposed calendaring event. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of detecting a mismatch in starting or ending times occurring between a calendar event notification and an agenda associated with the calendaring event notification and, in response to the detecting, presenting a prompt upon a display of the electronic device identifying the mismatch as described herein. The non-processor circuits may include, but are not limited to, a radio receiver, a radio transmitter, signal drivers, clock circuits, power source circuits, and user input devices.

As such, these functions may be interpreted as steps of a method to perform presenting, by one or more processors of an electronic device, a prompt at a user interface of an electronic device identifying that a mismatch between at least one calendaring event bounding time and at least one agenda bounding time associated with a calendaring event notification. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods, electronic devices, and systems for identifying, flagging, and allowing the correction of mismatches occurring between calendaring event notifications and agendas associated with those calendaring event notifications. Illustrating by example, if a calendaring event notification indicates that a proposed meeting occurs from 9:00 AM and 4:00 PM, but the agenda attached to the calendaring event notification indicates that the agenda for the meeting begins at 9:30 AM and ends at 4:00 PM, in one or more embodiments one or more processors of an electronic device will detect this mismatch occurring between the starting or ending times of the calendaring event notification and the agenda associated with the calendaring event notification.

In one or more embodiments, the one or more processors will then present a prompt upon a display or other user interface of the electronic device to identify that the mismatch exists in response to detecting the same. Advantageously, embodiments of the disclosure help notify both creators of calendaring event notifications and recipients of calendaring event notifications containing agenda bounding time/calendaring event bounding time discrepancies so they can be corrected prior to any actual meeting, gathering, or other event occurring.

Embodiments of the disclosure contemplate that time is everyone's most limited and precious resource. This is especially true in the business community, where great importance is placed on maximizing efficiency through time management. Efficiency is also valued in other fields as well, including academia, government, and other venues for which groups of individuals collaborate on projects.

To assist in making collaborative work efforts more efficient, such groups frequently employ time-management tools. Examples of such time-management tools include calendaring applications, Gantt charts, and program management software. Examples of calendaring applications include the Microsoft™ Exchange (or Outlook) Calendar program, the iCal (or iCalendar) calendar program available from Apple Inc.™, or the Google Calendar available from Google™. As used herein, the term "calendaring application" refers to a calendar application operable with one or more processors of an electronic device to create, store, and manage calendaring event notifications and/or a software-based program that may be accessible from a calendaring server across a network. In one or more embodiments, calendaring applications may be used to track events and appointments, such as meetings and s forth, for a calendar user in order to identify conflicts and free time.

These tools are effective in providing oversight for larger projects that involve numerous tasks, as well as subtasks associated with these tasks. The time-management tools sometimes additionally provide scheduling functionality with which individuals associated with a project can schedule meetings, meet, and share information.

While many time-management tools work fairly well for efficiency in moving a project toward completeness, they are often less effective at bringing about personal productivity. Consider group meetings as an illustrative example. In many corporate or other organizational settings, meetings tend to be large, lengthy, and involve multiple participants. It is frequently the case that many participants in a meeting are only directly involved with small portions of the meeting. In an executive meeting spanning a full working day, for example, a mid-level manager may only be required to make a thirty-minute presentation. That manager may not even need to be present for the remainder of the meeting. For this reason, many meeting invitations include an agenda outlining the topics to be covered, as well as when various participants are required to be in attendance.

Embodiments of the disclosure contemplate that scheduling discrepancies can routinely occur when creating calendaring event notifications. These discrepancies can result in conflicts occurring between at least one calendaring event bounding time, e.g., the starting time of a calendaring event, the ending time of the calendaring event, or other point of reference occurring during the calendaring event, and at least one agenda bounding time. Where such scheduling discrepancies arise, they can be counterproductive. They can additionally cause participants to miss a meeting or attend at a non-appointed time.

Embodiments of the disclosure provide a solution that works to eliminate such discrepancies. In one or more embodiments, a method in an electronic device comprises detecting, with one or more processors of the electronic device, receipt of user input at a user interface of the electronic device defining a calendaring event notification. In one or more embodiments, the calendaring event notification includes an agenda. For example, the calendaring event notification may be a Monday meeting that an organizer schedules by creating a calendaring event notification in a calendaring application, and that has an agenda attached thereto, included within the body of the calendaring event notification, or attached to the calendaring event notification as a link.

In one or more embodiments, the one or more processors compare at least one calendaring event bounding time with at least one agenda bounding time. Examples of calendaring event bounding times include the calendaring event start time and the calendaring event stop time. Calendaring event bounding times can also include calendaring event break times or other consequential time occurrences during the calendaring event. Examples of agenda bounding times include the agenda start time and the agenda conclusion time. Agenda bounding times can also include agenda break times or other consequential time occurrences within the agenda.

In one or more embodiments, where there is a mismatch between at least one calendaring event bounding time and at least one agenda bounding time, the one or more processors present a prompt at a user interface of the electronic device identifying the fact that the mismatch exists. Thus, if the organizer of a meeting creating a calendaring event notification sets the start time at 9:00 AM, and the conclusion time at 4:00 PM, and then attaches an agenda with a start time of 9:30 AM, and conclusion time of 4:00 PM, in one or more embodiments the one or more processors of the electronic device with which the calendaring event notification is being created will detect this mismatch and will present a prompt at the user interface identifying that the mismatch exists. The organizer, thusly alerted to the fact that there is a mismatch in bounding times, can then correct the mismatch in response to being alerted to the same by the prompt.

While presenting the prompt at the time of creation of the calendaring event notification works well, embodiments of the disclosure can function just as well on the recipient's end. In one or more embodiments one or more processors of an electronic device detect receipt of a calendaring event notification from another electronic device across a network that includes an agenda associated therewith. In one or more embodiments, the one or more processors compare at least one calendaring event bounding time with at least one agenda bounding time. Where there is a mismatch between the at least one calendaring event bounding time and the at least one agenda bounding time, in one or more embodiments the one or more processors present a prompt at the user interface of the electronic device identifying that the mismatch exists. Advantageously, this allows the recipient to either alter the calendaring event notification locally in their calendaring application to correct the mismatch, or alternatively to notify the organizer that the mismatch is a problem.

Turning now to FIG. 1, illustrated therein is one explanatory calendaring system 100 in accordance with one or more embodiments of the disclosure. As shown, multiple calendaring application users 107,108,109,110 each employ their own respective electronic devices 101,102,103,104 to coordinate mutually convenient times to gather using a calendaring application. It should be appreciated that while only four electronic devices 101,102,103,104 are shown in FIG. 1, any number of electronic devices, nodes, links, etc. may be used in the calendaring system 100.

The calendaring application used in the calendaring system 100 is operable with the various electronic devices 101,102,103,104 due to the fact that it is an electronic calendaring application operable on one or more processors of each of the electronic devices 101,102,103,104. As used herein, the terms "computerized" and "electronic," when used in conjunction with the calendaring system, refer to a calendaring system that may be implemented as executable code operable on one or more processors of one or more of the electronic devices 101,102,103,104, or as a calendaring system implemented independently as hardwired circuitry or logic, or as a combination of hardwired circuitry or logic, or other components, and executable instructions executing on one or more processors of the various electronic devices 101,102,103,104.

In this illustrative embodiment, electronic devices 101, 102 are shown as smartphones, while electronic devices 103,104 are shown as desktop computers. However, electronic devices operable with calendaring applications in accordance with embodiments of the disclosure can take other forms as well. For instance, tablet computers, notebook computers, audiovisual devices, mobile phones, smart watches, or other devices can be used by participants to create, store, and manage calendaring event notifications using a calendaring application as well. Other examples of electronic devices suitable for use with the methods described herein will be obvious to those of ordinary skill in the art having the benefit of this disclosure.

As shown in FIG. 1, each electronic device 101,102,103, 104 is engaged in wired or wireless communication with each other electronic device 101,102,103,104 across a network 105, one example of which is the Internet via the World Wide Web. It should be noted that the network 105 could be a public, private, local area, wide area, or other type of network across which wired or wireless electronic communications can be exchanged.

The electronic devices 101,102,103,104 operating in the calendaring system 100 may optionally communicate with a calendaring server 106 across the network 105. Where included, the calendaring server 106 can function to synchronize a particular user's calendar between various electronic devices belonging to that user, as well as synchronizing calendaring events and calendaring event notifications for each of the calendaring application users 107,108,109, 110.

Thus, a calendaring application user 107,108,109,110 may employ the calendaring server 106 to alter the contents of their personal calendar from one electronic device to another electronic device they own. Additionally, any one calendaring application user 107 can synchronize mutual meetings and other calendaring events with any other calendaring application user 108 as well. In one or more embodiments the calendaring server 106 functions to store and distribute the calendaring events and calendaring event notifications accordingly.

In other embodiments, calendars, calendaring events, and calendaring event notifications may also be stored on a particular electronic device. Synchronization between electronic devices may alternatively occur between directly between electronic devices without an intermediary server. Moreover, a calendar, its associated calendaring events and/or calendaring event notifications may be simply stored on a particular electronic device itself, without needing an interconnection with a computer network.

As will be described in more detail with reference to FIG. 8 below, in one or more embodiments calendaring server 106 includes components such as a web server, a database server, and a calendar data server that are operable to facilitate the communication of calendars, calendaring events, and calendaring event notifications between the various electronic devices 101,102,103,104 of the calendaring system 100. These components of calendaring server 106 can be combined on the same server. Alternatively, these components can be distributed on any number of servers to increase load handling capacity beyond that of a single server, and so forth. Other configurations for the calendaring server 106 will be obvious to those of ordinary skill in the art having the benefit of this disclosure.

In one or more embodiments, the calendaring server 106 functions as an intermediary device to facilitate sharing of calendaring data, which can include calendar events and calendaring event notifications, between the various electronic devices 101,102,103,104. For example, as can be seen on the displays of electronic device 101,102, in this example each calendaring application user 107,108,109,110 can see a calendaring event notification 111 originating from calendaring application user 110. In this example, the calendaring event notification 111 is to organize a "Big Time Meeting," which is scheduled for Friday and has a calendar event information section that is delineated from an event agenda section by a linear boundary, which in this illustrative example is a horizontal line. The calendaring event notification 111 includes one or more calendaring event bounding times, which in this example include a starting calendaring event bounding time 112 and an ending calendaring event bounding time 113.

The starting calendaring event bounding time 112 and the ending calendaring event bounding time 113 can vary across time zones. Note that calendaring application user 107,108, 109,110 is in a different time zone in this example. Calendaring application user 110 is in Chicago, and thus is in the Central Time Zone. Calendaring application user 109, being in Brazil, is two hours ahead of calendaring application user 110, while calendaring application user 108 is in the Eastern Time Zone in Atlanta, and is an hour ahead of calendaring application user 110. Calendaring application user 107, being in India, is a full twelve and a half hours ahead of calendaring application user 110.

Accordingly, when calendaring application user 110 sets the starting calendaring event bounding time 112 for 8:00 AM CDT, and sets the ending calendaring event bounding time 113 for 3:00 PM CDT, each calendaring application user 107,108,109 would, in turn see a different time. In this illustrative example, calendaring application user 107 sees the starting calendaring event bounding time 112 as 8:30 PM and the ending calendaring event bounding time 113 as 3:30 AM. Similarly, calendaring application user 108 sees the starting calendaring event bounding time 112 as 9:00 AM, while the ending calendaring event bounding time 113 shows as 4:00 PM, and so forth.

In one or more embodiments, the calendaring event notification 111 also has an agenda 114 associated therewith. In this illustrative embodiment, the agenda 114 appears in the body of the calendaring event notification 111. As will be described below with reference to FIGS. 4 and 5, in other embodiments the agenda 114 can be attached to the calendaring event notification 111 as a separate file. In still other embodiments, the agenda 114 can be embedded in the calendaring event notification 111 as a link or hyperlink. Other techniques for associating the agenda 114 with the calendaring event notification 111 will be obvious to those of ordinary skill in the art having the benefit of this disclosure.

In one or more embodiments, the agenda 114 delineates the portions and topics of the big time meeting. In this illustrative embodiment, the agenda 114 additionally defines when those portions and topics will commence and end. Accordingly, the agenda 114 includes at least one agenda bounding time. Illustrating by example, in FIG. 1 the visible agenda bounding times present in the calendaring event notification 111 include a first agenda bounding time 115 identifying the start of the agenda 114, a second agenda bounding time 116 identifying a transition from a first portion of the agenda 114 to a second portion of the agenda 114, and so forth.

In this illustrative example, rather than creating the calendaring event notification 111 from scratch, calendaring application user 110 has elected to pull up a prior calendaring event notification and edit the same to create a new calendaring event notification. Embodiments of the disclosure contemplate that when a meeting or other event is a recurring one, it is often the case that a calendaring application user will simply edit a prior calendaring event notification rather than taking the time to completely create a new one. Embodiments of the disclosure also contemplate that this can result in errors, and in particular, discrepancies between at least one calendaring event bounding time and at least one agenda bounding time.

In this illustrative example, calendaring application user 110 is the organizer of the big time meeting, which occurs monthly. Accordingly calendaring application user 110 schedules the big time meeting on the first Friday of every month. It is generally the case that the big time meeting will last a full day. In the illustrative embodiment of FIG. 1, the big time meeting will last the majority of the workday, as is indicated by the starting calendaring event bounding time 112 and the ending calendaring event bounding time 113 of FIG. 1.

Calendaring application user 110 is very organized, and so too is the big time meeting. Accordingly, calendaring application user 110 itemizes all sub-portions of the big time meeting in the agenda 114. Not only does the agenda 114 indicate what topics will be covered when, as defined by the agenda bounding times 115,116, but it also indicates which other calendaring application users 107,108,109 need to be present at the big time meeting, as well as when they should be there. In this example, Buster is required to be present at 8:00 AM CDT to call the meeting to order. Mac needs to arrive by 8:30 CDT to present a patent disclosure, and so forth. One advantage of including this agenda 114 is the fact that it provides each calendaring application user 107,108, 109,110 the flexibility of joining the big time meeting for either its entirety or, alternatively, only for the specific allotted time during which they are actually involved in the big time meeting.

Despite the fact that the big time meeting is indeed "big time," during some months there will inevitably be fewer agenda items for the big time meeting than there are in others. Illustrating by example, there are some instances of the big time meeting where the number of agenda items is fewer, which results in the big time meeting not consuming an entire workday. In such occasions, embodiments of the disclosure contemplate that calendaring application user 110 may decide to alter, edit, or delete items from the agenda 114 to make the same more convenient for the various big time meeting participants. When this occurs, embodiments of the disclosure contemplate that calendaring application user 110 may inadvertently fail to change the starting calendaring event bounding time 112 or the ending calendaring event bounding time 113 accordingly. When this occurs, i.e., when there is a mismatch between the at least one calendaring event bounding time of the calendaring event notification 111 and the at least one agenda bounding time of the calendaring event notification 111, this can result in confusion by the participants as to when they should arrive, participate, depart, and so forth. Such discrepancies can even result in participants missing their portions of the big time meeting.

In the explanatory embodiment of FIG. 1, this unfortunately has occurred. As shown in the display of electronic device 102, the starting calendaring event bounding time 112 is 9:00 AM EDT. However, the first agenda bounding time 115 is 9:30 AM EDT. Accordingly, there is a mismatch between the at least one calendaring event bounding time of the calendaring event notification 111, here starting calendaring event bounding time 112, and the at least one agenda bounding time of the calendaring event notification 111, here first agenda bounding time 115.

Embodiments of the disclosure advantageously catch this discrepancy and flag it for the various calendaring application users 107,108,109,110. In one or more embodiments, embodiments of the disclosure initially determine that a meeting or other event is being scheduled from a user's account by detecting the creation of the calendaring event notification 111. One or more processors of one of the electronic devices 101,102,103,104, or alternatively one or more processors of the calendaring server 106, determine by parsing the text from the contents of the calendaring event notification 111 that there is an agenda 114 associated with the calendaring event notification 111. As noted above, the contents of the agenda 114 could be provided directly within the body of the calendaring event notification 111, as is the case in the explanatory embodiment of FIG. 1. Alternatively, the agenda 114 could be stored outside the body of the calendaring event notification 111, e.g., in a memory of the calendaring server 106, and then linked to the calendaring event notification 111. In this latter scenario, the link to the agenda 114 could refer to a separate file or document or system where the agenda 114 is stored.

In one or more embodiments, one or more processors of one of the electronic devices 101,102,103,104, or alternatively one or more processors of the calendaring server 106, further determine that there is a discrepancy between at least one calendaring event bounding time 112,113 and at least one agenda bounding time 115,116. This determination can be done either at the sender side, e.g., at electronic device 104 where calendaring application user 110 is creating the calendaring event notification 111 and before the calendaring event notification 111 is distributed to the other calendaring application users 107,108,109, or at the recipient side, e.g., at electronic devices 101,102,103 in response to receiving the calendaring event notification 111. The former advantageously alerts the organizer, here calendaring application user 110 to the discrepancy, thereby allowing calendaring application user 110 to either update the agenda 114 to correct the discrepancy or modify the starting calendaring event bounding time 112 and/or ending calendaring event bounding time 113 to reflect and align with the agenda bounding times set forth in the agenda 114. The latter allows the other calendaring application users 107,108,109 to either notify calendaring application user 110 that there is a problem, or to modify the starting calendaring event bounding time 112 and/or ending calendaring event bounding time 113 to reflect and align with the agenda bounding times set forth in the agenda 114. Of course, a combination of the two approaches can be used as well.

In the illustrative embodiment of FIG. 1, one or more processors of each of electronic device 101,102,103 detect receipt of the calendaring event notification 111 from electronic device 101 across the network 105. The one or more processors of each of electronic device 101,102,103 also detect that the calendaring event notification 111 includes an agenda 114.

The one or more processors of each of electronic device 101,102,103 then compare at least one calendaring event bounding time, e.g., calendaring event bounding time 112, with at least one agenda bounding time, e.g., agenda bounding time 115. Since there is a mismatch between the at least one calendaring event bounding time and the at least one agenda bounding time, as shown in FIG. 1 the one or more processors of each electronic device 101,102,103 present a prompt 117 at a user interface of each electronic device 101,102,103 (here, the display) identifying that the mismatch exists. In one or more embodiments, in addition to presenting the prompt 117 at the user interface of each electronic device 101,102,103, in one or more embodiments the one or more processors of any one electronic device 101,102,103 can also send an electronic communication to any other electronic device to allow the other participants and/or the organizer of the big time meeting to see that a discrepancy exists. Illustrating by example, electronic device 101 could detect the mismatch and then transmit a message alerting electronic devices 102,103,104 to the fact that the mismatch exists, and so forth.

While the one or more processors of each electronic device 101,102,103 perform this action in FIG. 1, it should be noted that the same operations could be performed by one or more processors of the calendaring server 106. Accordingly, in one or more embodiments the one or more processors performing these operations reside in a server complex, e.g., calendaring server 106, that is in communication with each electronic device 101,102,103 receiving the calendaring event notification 111 across a network 105.

In the illustrative embodiment of FIG. 1, in addition to presenting the prompt 117, the one or more processors of each electronic device 101,102,103 receiving the calendaring event notification 111 also modify the appearance of the calendaring event notification 111 to make identification of the mismatch easier to see. While this can be done by highlighting the mismatch, changing a font of the text of the calendaring event notification 111 to identify the mismatch, or applying a geometric object, e.g., a circle or square, circumscribing the text of the calendaring event notification 111 to identify the mismatch, in the illustrative embodiment of FIG. 1 the one or more processors of each electronic device 101,102,103 receiving the calendaring event notification 111 apply arrows pointing to text of the calendaring event notification to identify the mismatch. Specifically, the one or more processors of electronic devices 101,102,103 apply arrows to the calendaring event notification 111 pointing to the starting calendaring event bounding time 112 and the first agenda bounding time 115 to identify the discrepancy between these two times. Other techniques for identifying the mismatch will be obvious to those of ordinary skill in the art having the benefit of this disclosure.

Accordingly, as shown in FIG. 1, either one or more processors of the electronic devices 101,102,103 receiving the calendaring event notification 111, or alternatively one or more processors of the calendaring server 106, determine that the calendaring event notification 111 has been received with a proposed itemized agenda, e.g., agenda 114, associated therewith. These one or more processors then determine, by parsing the text from the contents of the calendaring event notification 111 in one or more embodiments, that there exists a discrepancy between at least one calendaring event bounding time and at least one agenda bounding time. As before, the contents of the agenda 114 could be provided directly in the body of the calendaring event notification 111, as an attachment to the calendaring event notification 111, or as a link in the calendaring event notification 111.

In one or more embodiments, before each calendaring application user 107,109,109 accepts the calendaring event notification, these one or more processors present the prompt 117 identifying that the mismatch exists. In one or more embodiments, the prompt 117 provides the calendaring application users 107,108,109 the opportunity to either notify the meeting organizer, here calendaring application user 110, to modify one or both of the calendaring event notification 111 and/or the agenda 114, or alternatively while saving the calendaring event notification 111 in his calendar adjust the starting calendaring event bounding time 112 or the ending calendaring event bounding time 113 to match the agenda bounding times of the agenda 114.

Advantageously, the calendaring system 100 of FIG. 1 determines scheduling discrepancies and proposals to correct the same with meeting start/end timings against a proposed/scheduled meeting agenda. This can occur either at the meeting organizer's account or at the meeting invite recipient's account.

Figure 2:
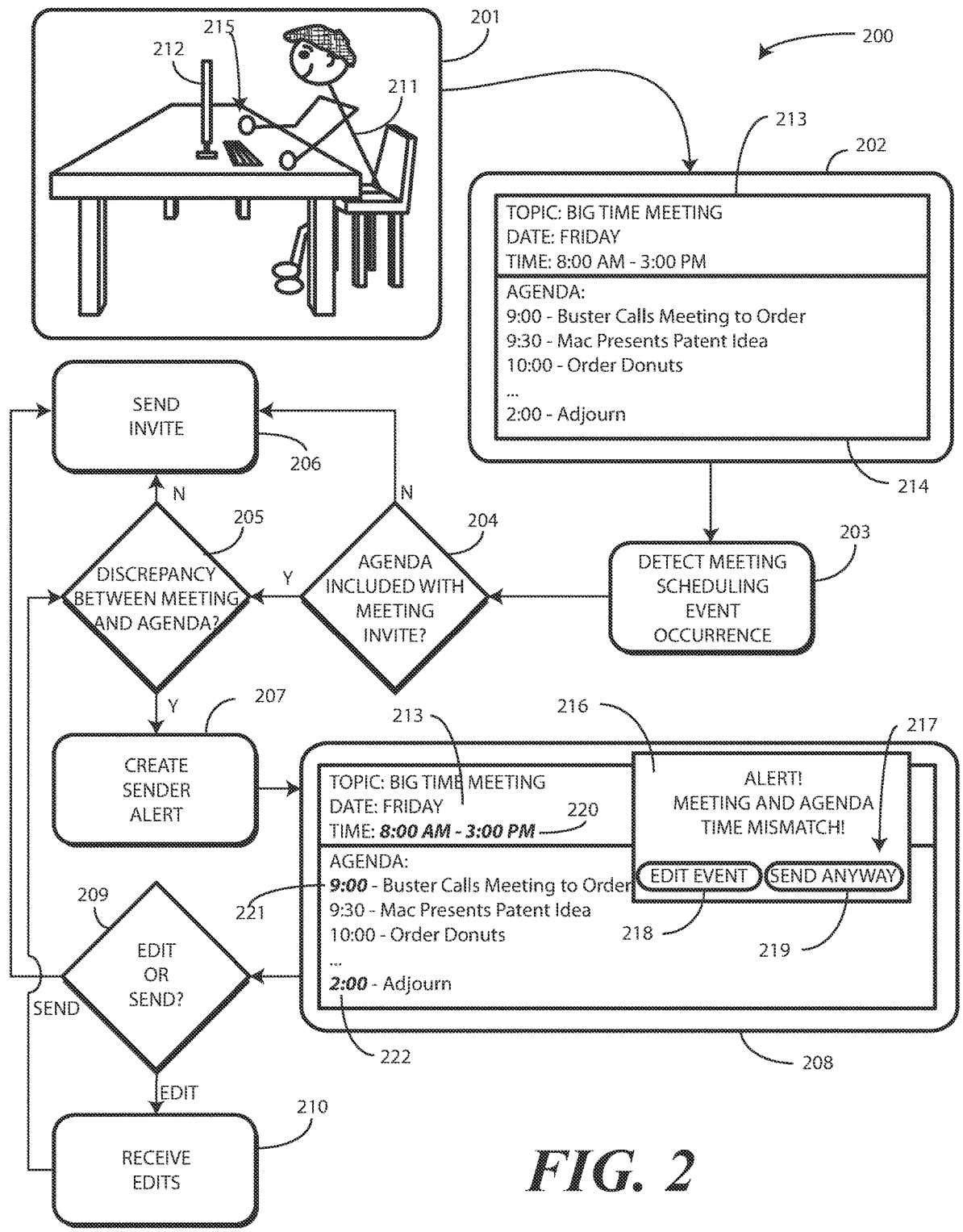
FIG. 2 illustrates one or more method steps in accordance with one or more embodiments of the disclosure.

Turning now to FIG. 2, illustrated therein is one explanatory method 200 of identifying calendaring event bounding time and agenda bounding time discrepancies at the meeting organizer's side before any calendaring event notification is transmitted. Beginning at step 201, a meeting organizer 211 employs an electronic device 212 to create a calendaring event notification 213, which is shown at step 202.

Figure 4:
FIG. 4 illustrates one explanatory user interface of one explanatory electronic device presenting an illustrative alert in accordance with one or more embodiments of the disclosure.
Figure 5:
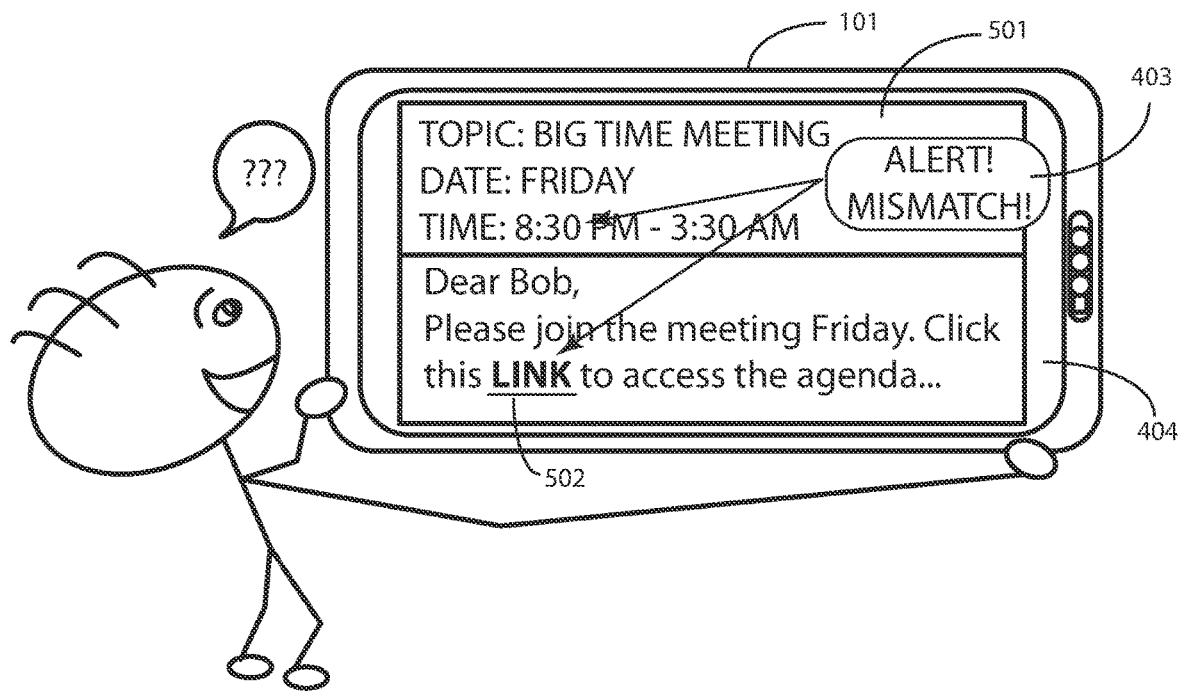
FIG. 5 illustrates another explanatory user interface of another explanatory electronic device presenting an illustrative alert in accordance with one or more embodiments of the disclosure.

As shown at step 202, the calendaring event notification 213 includes an agenda 214. In this illustrative embodiment, the agenda 214 is set forth in the body of the calendaring event notification 213. However, the agenda 214 can be associated with the calendaring event notification 213 in other ways as well. Turning briefly to FIGS. 4 and 5, illustrated therein are two alternative techniques for associating an agenda with a calendaring event notification. Other techniques for associating an agenda with a calendaring event notification will be obvious to those of ordinary skill in the art having the benefit of this disclosure.

Beginning with FIG. 4, in this illustrative embodiment the agenda 402 is attached to the calendaring event notification 401 as a file. Said differently, in this illustrative embodiment the agenda 402 comprises an attachment attached to the calendaring event notification 401.

In one or more embodiments, one or more processors of the electronic device 101, or alternatively one or more processors of a calendaring server (106) in communication with the electronic device 101, can parse through the text of both the calendaring event notification 401 and the agenda 402, which is attached to the calendaring event notification 401 as a document in FIG. 4, to determine whether a mismatch occurs between at least one calendaring event bounding time and at least one agenda bounding time. Where the one or more processors detect a mismatch in starting or ending times occurring between the calendaring event notification 401 and the agenda 402 associated with the calendaring event notification 401, they can present a prompt 403 upon the display 404 of the electronic device 101 identifying the mismatch.

Turning now to FIG. 5, in this illustrative embodiment the agenda is attached to the calendaring event notification 501 as a link. Said differently, in this illustrative embodiment the agenda is linked to the calendaring event notification 501 by a hyperlink 502.

In one or more embodiments, one or more processors of the electronic device 101, or alternatively one or more processors of a calendaring server (106) in communication with the electronic device 101, can parse through the text of both the calendaring event notification 501 and the agenda that is accessible via the hyperlink 502 to determine whether a mismatch occurs between at least one calendaring event bounding time and at least one agenda bounding time. Where the one or more processors detect a mismatch in starting or ending times occurring between the calendaring event notification 501 and the agenda linked to the calendaring event notification 501, they can present a prompt 403 upon the display 404 of the electronic device 101 identifying the mismatch.

Turning now back to FIG. 2, at step 203 one or more processors of either electronic device 212, or alternatively one or more processors of a calendaring server (106) in communication with electronic device 212, detect receipt of user input 215 at a user interface (here, a keyboard) of electronic device 212 defining the calendaring event notification 213. In one or more embodiments, the calendaring event notification 213 comprises the at least one calendaring event bounding time. In this illustrative embodiment, the calendaring event notification 213 comprises both a calendaring event commencement time (8:00 AM) and a calendaring event conclusion time (3:00 PM).

Decision 204 determines whether there is an agenda 214 associated with the calendaring event notification 213. If no agenda 214 is associated with the calendaring event notification 213, the calendaring event notification 213 can simply be sent to recipient electronic devices at step 206. However, where the calendaring event notification 213 has an agenda 214 embedded in the body of the calendaring event notification 213, configured as an attachment to the calendaring event notification 213, linked to the calendaring event notification 213, or otherwise associated with the calendaring event notification 213, the method 200 moves to decision 205.

At decision 205, one or more processors of either electronic device 212, or alternatively one or more processors of a calendaring server (106) in communication with electronic device 212, compare at least one calendaring event bounding time of the calendaring event notification 213 with at least one agenda bounding time of the agenda 214. In one or more embodiments, decision 205 comprises one or both of a subject heading or a body of the calendaring event notification 213 to determine whether the agenda 214 is defined by the body of the calendaring event (as is the case in FIG. 2), attached to the calendaring event notification as an attachment (as is the case in FIG. 4), or linked to the calendaring event notification by a hyperlink (as is the case in FIG. 5).

Where there are no discrepancies, the calendaring event notification 213 can be sent to recipient electronic devices at step 206. However, where there is a mismatch between at least one calendaring event bounding time and at least one agenda bounding time, in one or more embodiments the one or more processors of either electronic device 212, or alternatively one or more processors of a calendaring server (106) in communication with electronic device 212, can present a prompt 216 at a user interface of the electronic device 212 identifying that the mismatch exists at step 207. One example of a prompt 216 is shown at step 208.

As shown at step 208, in one or more embodiments the prompt 216 includes at least one remediating option 217 for correcting the mismatch. In the illustrative embodiment of FIG. 2, the at least one remediating option comprises an editing option 218 that allows editing of one or both of the at least one calendaring event bounding time and/or the at least one agenda bounding time. In other embodiments, the at least one remediating option comprises sending the calendaring event notification anyway at element 219.

Figure 6:
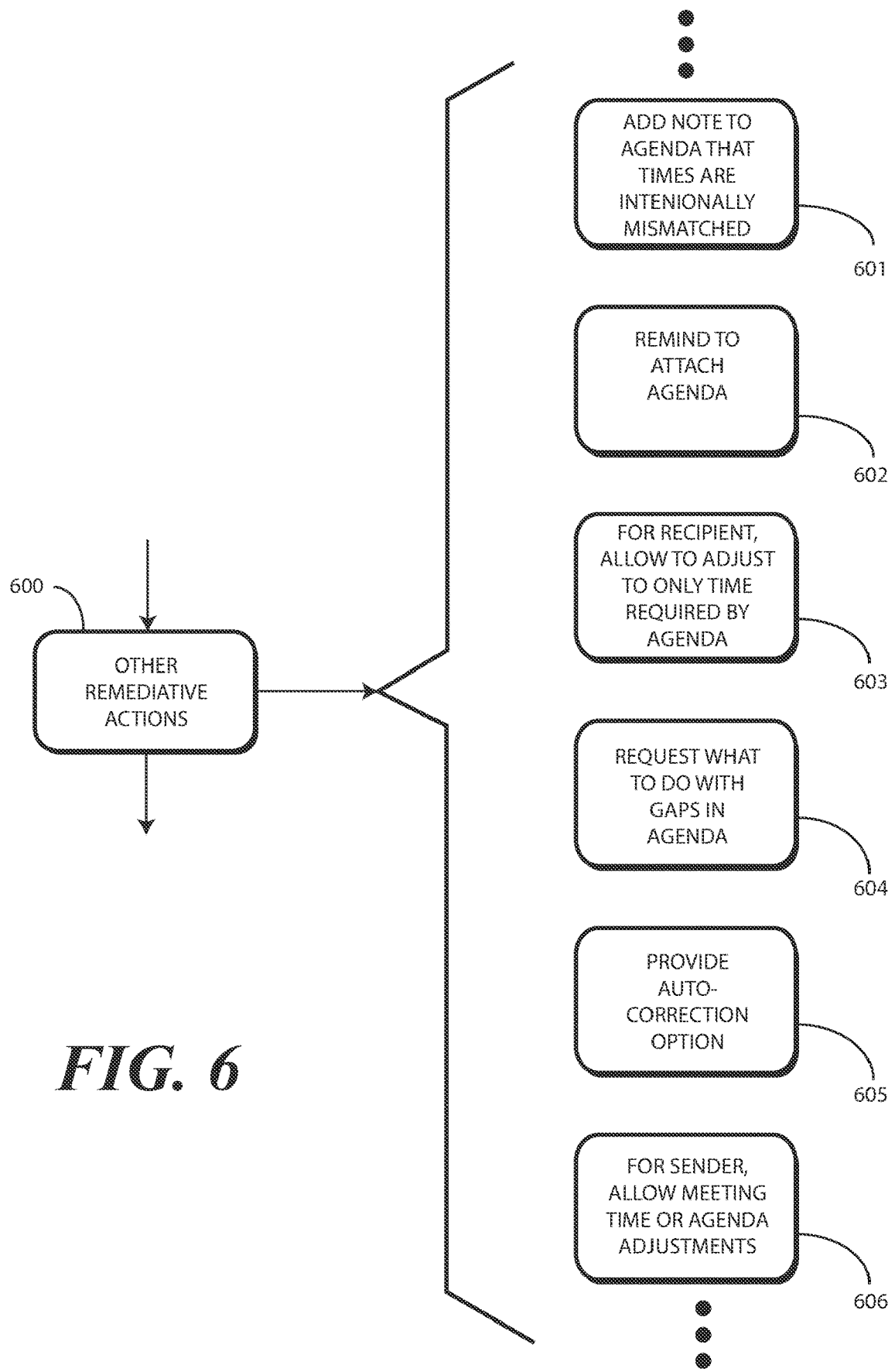
FIG. 6 illustrates one explanatory method in accordance with one or more embodiments of the disclosure.

The at least one remediating option can take other forms as well. Turning briefly to FIG. 6, illustrated therein are some of the remediating options 600 suitable for use with either the method (200) of FIG. 2 above, the method (300) of FIG. 3 below, or with other embodiments of the disclosure. This list of remediating options 600 is not inclusive, as other remediating options will be obvious to those of ordinary skill in the art having the benefit of this disclosure.

In one or more embodiments, a remediating option 601 comprises adding a note to the agenda that the calendaring event bounding times and the agenda bounding times are intentionally mismatched. Embodiments of the disclosure contemplate that in some situations, a meeting organizer will intentionally cause an agenda and calendaring event bounding times to misalign. Consider, for example, a situation where the meeting organizer wants the first part of a meeting to allow for participant registration, with the first substantive item on the agenda to occur thereafter. The meeting organizer may intentionally cause the first calendaring event bounding time to be before the first agenda bounding time to allow for this fact to occur. Accordingly, in one or more embodiments the remediating option adds a note indicating that this mismatch is intentional.

In one or more embodiments, the remediating option 602 comprises presenting a prompt with a reminder to attach the agenda. Embodiments of the disclosure contemplate that mismatches between the calendaring event bounding times and agenda bounding times can occur due to the fact that the meeting organizer failed to attach any agenda, thereby causing the agenda bounding times to be omitted. Accordingly, in one or more embodiments the remediating option 602 prompts a meeting organizer to attach an agenda to a calendaring event notification.

In one or more embodiments, the remediating option 603 comprises allowing a recipient of a calendaring event notification to adjust the calendaring event bounding times stored in their calendar to only those times where the recipient is required by the agenda to be in attendance. If, for example, there is a mismatch in the calendaring event notification starting time and the agenda starting time, the recipient may want to simply save the received event in their calendar for only the times indicated in the agenda where they are required to attend. Accordingly, in one or more embodiments the remediating option 603 allows for this action to occur.

In one or more embodiments, the remediating option 604 comprises presenting a prompt requesting what to do with detected discrepancies. If, for example, a meeting organizer inadvertently misaligns the earliest agenda bounding time and the starting calendaring event bounding time, in one or more embodiments the prompt presented to the meeting organizer requests what should happen during the gap. Embodiments of the disclosure contemplate that the meeting organizer may want to have, for example, an executive committee session before the meeting participants arrive. Additionally, the meeting organizer may not want to publicize this executive committee session in the agenda. Advantageously, remediating option 604 allows the meeting organizer to take the necessary steps to ensure that the executive committee session is properly accounted for in the calendaring event notification.

In one or more embodiments, the remediating option 605 provides an autocorrect feature allowing an automatic adjustment of one or both of the calendaring event bounding times of the calendaring event notification and/or the agenda bounding times of the agenda. If, for example, the starting calendaring event bounding time was 8:00 AM, and the starting agenda bounding time was 8:30 AM, the remediating option may ask, "Change the meeting start to 8:30? Or change the agenda start to 8:00?" In one or more embodiments, the meeting organizer—or the recipient for that matter—could simply click one option or the other so that the one or more processors could automatically adjust the proper time as necessary.

In one or more embodiments, the remediating option 606 comprises allowing editing one or both of the at least one calendaring event bounding time or the at least one agenda bounding time. While this can occur at the recipient's electronic device, this remediating option 606 is most helpful to the meeting organizer, as it helps the meeting organizer catch mistakes before the calendaring event notification including those mistakes is transmitted to recipient electronic devices.

Turning now back to FIG. 2, in one or more embodiments the one or more processors of either electronic device 212, or alternatively one or more processors of a calendaring server (106) in communication with electronic device 212, preclude, at step 208, transmission of the calendaring event notification 213 until the mismatch is corrected. In other embodiments, the prompt 216 will include a "send anyway" option that allows the meeting organizer 211 to override any transmission preclusion and send the calendaring event notification 213 to recipient devices despite the problem.

In one or more embodiments, the one or more processors of either electronic device 212, or alternatively one or more processors of a calendaring server (106) in communication with electronic device 212, will modify the calendaring event notification 213 to identify the mismatch in addition to presenting the prompt 216. In this illustrative embodiment, the one or more processors of either electronic device 212, or alternatively one or more processors of a calendaring server (106) in communication with electronic device 212, have both highlighted and changed the font of text 220,221, 222 setting forth the conflicting calendaring event bounding times and agenda bounding times to italicized text. As noted above, highlighting and changing the font are but a few of the methods of modifying the calendaring event notification 213 to identify the mismatch in addition to presenting the prompt 216 in accordance with embodiments of the disclosure. Other techniques include changing a font of the text to identify the mismatch, e.g., the italicizing occurring in FIG. 2, applying a geometric object circumscribing the text to identify the mismatch, or applying arrows pointing to the text to identify the mismatch (as illustrated above in FIG. 1). Other techniques will be obvious to those of ordinary skill in the art having the benefit of this disclosure.

Decision 209 determines whether the meeting organizer 211 makes edits to correct the mismatch between the calendaring event bounding times and the agenda bounding times. Where he does, step 210 receives the user input entering the edits. Once all edits have been received at step 210, the method can return to decision 205. Provided the discrepancy has been rectified, the calendaring event notification 213 can then be transmitted at step 206 to the recipient electronic devices.

Figure 3:
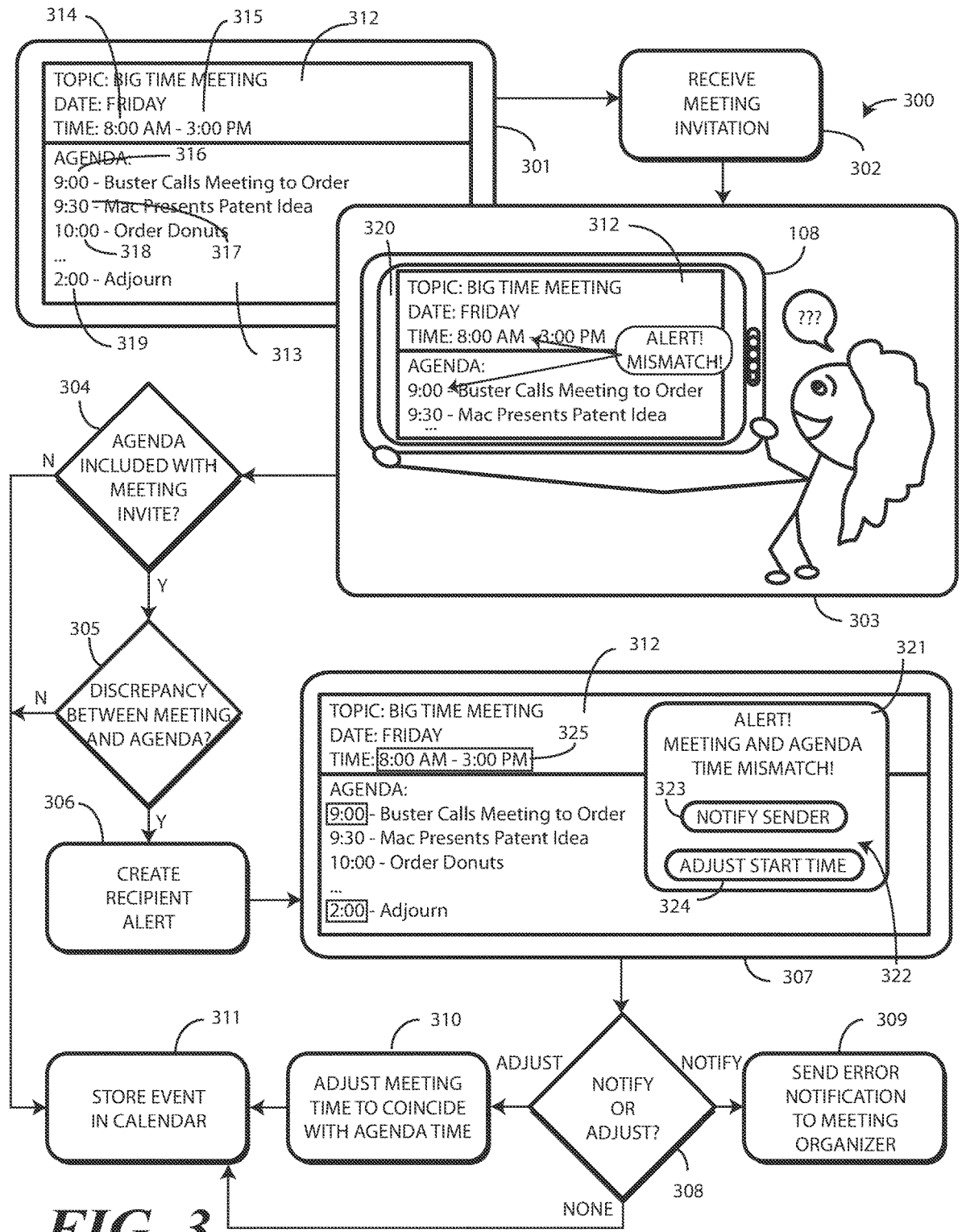
FIG. 3 illustrates one or more methods steps in accordance with one or more embodiments of the disclosure.

Turning now to FIG. 3, illustrated therein is another method 300 where identification of a discrepancy between at least one calendaring event bounding time and at least one agenda bounding time occurs at an electronic device receiving a calendaring event notification. As noted above, the method (200) of FIG. 2 and the method 300 of FIG. 3 could be used alone or in combination.

Beginning at step 301, a meeting organizer has created a calendaring event notification 312. At step 301, the calendaring event notification 312 includes an agenda 313. The calendaring event notification 312 defines at least one calendaring event bounding time, while the agenda 313 defines at least one agenda bounding time. In this illustrative embodiment, the calendaring event notification 312 defines a calendar event bounding time 314 and a calendaring event conclusion time 315, while the agenda 313 defines several agenda bounding times 316,317,318,319 defining events occurring during the meeting proposed by the calendaring event notification 312. These events include an agenda commencement time and an agenda conclusion time.

At step 302, one or more processors of an electronic device, or alternatively one or more processors of a calendaring server, detect receipt of the calendaring event notification 312 and it's associated agenda 313 from an electronic device of the meeting organizer across a network. At step 303, one or more processors of the electronic device 102 receiving the calendaring event notification 312 present the calendaring event notification 312 on the display 320 of the electronic device 102.

Decision 304 determines whether there is an agenda 313 in the body of the calendaring event notification 312, attached to the calendaring event notification 312, or linked to the calendaring event notification 312. If no agenda 313 is associated with the calendaring event notification 312, in one or more embodiments the one or more processors of the electronic device 102, or alternatively one or more processors of a calendaring server (106), store the calendaring event notification 312 as a calendaring event in a calendar at step 311.

In this illustrative embodiment, there is an agenda 313 included in the body of the calendaring event notification 312. Accordingly, the method 300 moves to decision 305. At decision 305, one or more processors of the electronic device 102, or alternatively one or more processors of a calendaring server (106) compare at least one calendaring event bounding time with at least one agenda bounding time. Illustrating by example, the one or more processors may compare the starting calendaring event bounding time 314, which is 8:00 AM, with the earliest agenda bounding time 316, which is 9:00 AM. Decision 305 therefore determines that there is a mismatch between the starting calendaring event bounding time 314 and the first agenda bounding time 316. Where there is a mismatch, at step 306 the one or more processors of the electronic device 102, or alternatively the one or more processors of the calendaring server (106) present a prompt at a user interface of the electronic device 102 identifying the mismatch exists. One example of such a prompt 321 is shown at step 307.

In one or more embodiments, the prompt 321 presents at least one remediating option 322 for correcting the mismatch determined at decision 305. As noted above, the at least one remediating option could take any of those described with reference to FIG. 6. In this illustrative embodiment, the at least one remediating option 322 comprises the presentation of an icon 323 where actuation of the icon 323 sends an electronic communication to an electronic device belonging to the originator of the calendaring event notification 312 across a network (105). In one or more embodiments, the electronic communication comprises a notification of the mismatch detected at decision 305. This allows the meeting organizer to correct the mismatch. Alternatively, another icon 324 presented in the prompt 321 automatically corrects the mismatch in the calendar of the electronic device 102 receiving the calendaring event notification 312.

In one or more embodiments, rather than sending an electronic communication only to an electronic device belonging to the originator of the calendaring event notification 312 across the network (105), icon 323 (or another icon presented in addition to icon 323 and icon 324) can additionally cause the transmission of an electronic communication to electronic devices belonging to the other participants to allow those other participants to see that a discrepancy exists. The inclusion of such an option advantageously assists other participants in correcting the mismatch when the organizer is unable to do so. Additionally, if another participant's electronic device is not equipped to initially identify the mismatch, receipt of such a message in response to the actuation of the icon on another electronic device would beneficially alert the owner of the electronic device to determine that the mismatch exists.

In one or more embodiments, the one or more processors of either electronic device 102, or alternatively one or more processors of a calendaring server (106) in communication with electronic device 102, will modify the calendaring event notification 312 to identify the mismatch in addition to presenting the prompt 321. In this illustrative embodiment, the one or more processors of either electronic device 102, or alternatively one or more processors of a calendaring server (106) in communication with electronic device 102, have applied a geometric object 325 circumscribing the text setting forth the conflicting calendaring event bounding times and agenda bounding times. As noted above, the application of the geometric object 325 is but one way to identify the mismatch in addition to presenting the prompt 321 in accordance with embodiments of the disclosure. Other techniques include changing a font of the text to identify the mismatch (as illustrated above in FIG. 2), highlighting the text to identify the mismatch (as illustrated above in FIG. 2), or applying arrows pointing to the text to identify the mismatch (as illustrated above in FIG. 1). Other techniques will be obvious to those of ordinary skill in the art having the benefit of this disclosure.

Decision 308 determines what remediating option the recipient of the calendaring event notification 312 selects, if any. If the remediating option selected comprises sending an electronic communication to the other electronic device across the network with the electronic communication comprising a notification of the mismatch, this electronic communication is sent at step 309. By contrast, if the recipient elects to simply adjust the times to eliminate the mismatch, this can occur at step 310. If the recipient does nothing, or if step 310 is performed, the calendaring event notification 312 can be stored in the calendar at step 311.

Figure 7:
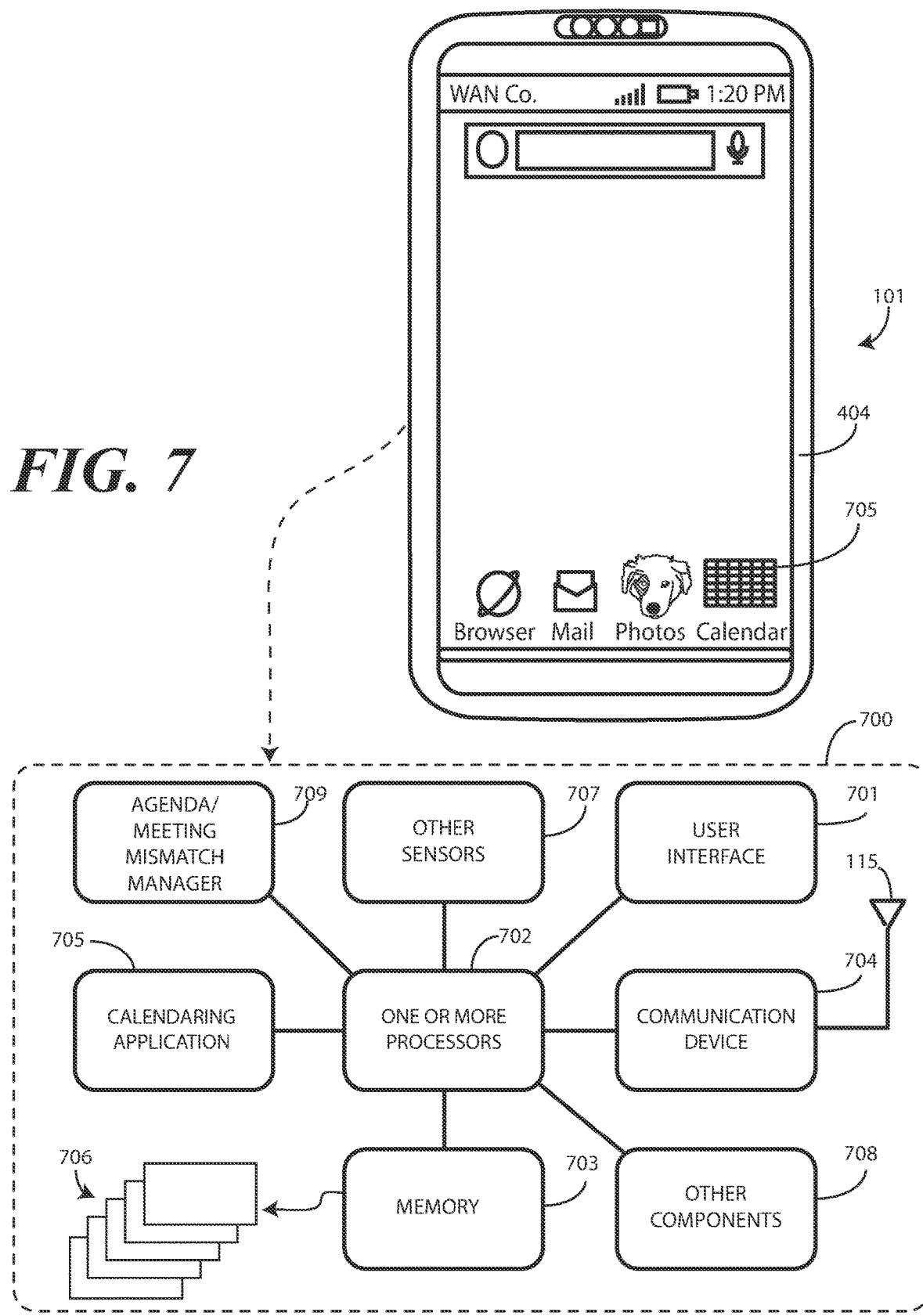
FIG. 7 illustrates one explanatory electronic device configured in accordance with one or more embodiments of the disclosure.

Turning now to FIG. 7, illustrated therein is one explanatory electronic device 101 suitable for use with embodiments of the disclosure. The electronic device 101 of FIG. 7 is a portable electronic device. For illustrative purposes, the electronic device 101 is shown as a smartphone. However, the electronic device 101 could be any number of other devices as well, including tablet computers, desktop computers, notebook computers, and so forth. Still other types of electronic devices can be configured in accordance with one or more embodiments of the disclosure as will be readily appreciated by those of ordinary skill in the art having the benefit of this disclosure.

This illustrative electronic device 101 includes a display 404, which may optionally be touch-sensitive. In one embodiment where the display 404 is touch-sensitive, the display 404 can serve as a primary user interface 701 of the electronic device 101. Users can deliver user input to the display 404 of such an embodiment by delivering touch input from a finger, stylus, or other objects disposed proximately with the display 404.

In one embodiment, the display 404 is configured as an active matrix organic light emitting diode (AMOLED) display. However, it should be noted that other types of displays, including liquid crystal displays, would be obvious to those of ordinary skill in the art having the benefit of this disclosure. Where the electronic device 101 is configured with a keyboard and/or mouse, such as when the electronic device 101 is configured as a computer, the keyboard and/or mouse can serve as the primary user interface 701.

A block diagram schematic 700 of the electronic device 101 is also shown in FIG. 7. The block diagram schematic 700 can be configured as a printed circuit board assembly disposed within the device housing of the electronic device 101. Various components can be electrically coupled together by conductors or a bus disposed along one or more printed circuit boards.

In one or more embodiments, the electronic device 101 includes one or more processors 702. In one embodiment, the one or more processors 702 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 101. Each of the application processor and the auxiliary processor(s) can be configured to process and execute executable software code to perform the various functions of the electronic device 101. A storage device, such as memory 703, can optionally store the executable software code used by the one or more processors 702 during operation.

The electronic device 101 also includes a communication device 704 that can be configured for wired or wireless communication with one or more other devices or networks. The networks can include a wide area network, a local area network, and/or personal area network. The communication device 704 may also utilize wireless technology for communication, such as, but are not limited to, peer-to-peer or ad hoc communications such as HomeRF, Bluetooth and IEEE 802.11, and other forms of wireless communication such as infrared technology. The communication device 704 can include wireless communication circuitry, one of a receiver, a transmitter, or transceiver, and one or more antennas.

In one embodiment, the one or more processors 702 can be responsible for performing the primary functions of the electronic device 101. For example, in one embodiment the one or more processors 702 comprise one or more circuits operable with one or more user interface devices, which can include the display 404, to receive user input creating calendaring event notifications, detect the receipt of calendaring event notifications from remote electronic devices, including calendar servers, and to detect mismatch occurrences between agendas embedded in, attached to, or linked to calendaring event notifications as previously described. The executable software code used by the one or more processors 702, including that associated with a calendaring application 705, can be configured as one or more modules 706 that are operable with the one or more processors 702. Such modules 706 can store instructions, control algorithms, logic steps, and so forth.

In one embodiment, the one or more processors 702 are responsible for running the operating system environment of the electronic device 101. The operating system environment can include a kernel and one or more drivers, and an application service layer, and an application layer. The operating system environment can be configured as executable code operating on one or more processors or control circuits of the electronic device 101. The application layer can be responsible for executing application service modules. The application service modules may support one or more applications or "apps," such as the calendaring application 705. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Illustrating by example, in one or more embodiments the memory 703 defines a non-volatile and non-transitory storage system that stores modules 706 and/or executable code for the calendaring application 705, including data, calendaring event notification storage code, calendaring event notification reception code, and calendaring event notification agenda mismatch determination code for detecting mismatches between calendaring event notifications and agendas included with, attached to, or linked to, created or received calendaring event notifications as described above with reference to the calendaring system (100) of FIG. 1, the method (200) of FIG. 2, and the method (300) of FIG. 3. The memory 703 may be operatively coupled to the one or more processors 702 via internal communications buses. Alternatively, the memory 703 may be integrated with the one or more processors 702, or may be some combination of operatively coupled memory and integrated memory.

It should be noted that while the modules 706 can be configured as one or more executable instructions stored in the memory 703, the could alternatively be configured as distributed systems or components of a distributed system having a server, such as an enterprise server, running the calendaring application 705, the agenda/calendaring event notification mismatch manager 709, or other elements of the electronic device 101.

In one or more embodiments, the one or more processors 702 are operative with the code and/or modules 706 to execute the calendaring application 705 to implement a computerized calendar in accordance with an embodiment. The calendaring application 705 can alternatively be implemented in a client-server operation where a calendaring server (106) stores the calendaring application 705 which is s accessed by the one or more processors 702 across a network (105) using the communication device 704.

In one embodiment, the one or more processors 702 may generate commands or execute control operations based upon user input received at the user interface 701. Moreover, the one or more processors 702 may process the received information alone or in combination with other data, such as the information stored in the memory 703.

The electronic device 101 can include one or more sensors 707. The one or more sensors 707 may include a microphone, an earpiece speaker, and/or a second loudspeaker. The one or more other sensors 707 may also include touch actuator selection sensors, proximity sensors, a touch pad sensor, a touch screen sensor, a capacitive touch sensor, and one or more switches. Touch sensors may used to indicate whether any of the user actuation targets present on the display 404. The other sensors 707 can also include audio sensors and video sensors (such as a camera).

Other components 708 operable with the one or more processors 702 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, the one or more processors 702 can define one or more process engines. For instance, the software code stored within the memory 703 can embody program instructions and methods to operate the various functions of the electronic device 101, and also to execute software or firmware applications and modules such as an agenda/calendaring event notification mismatch manager 709. Such process engines can be a component of the one or more processors 702, operable with the one or more processors 702, defined by the one or more processors 702, and/or integrated into the one or more processors 702. Other configurations for these engines, including as software or firmware modules operable on the one or more processors 702, will be obvious to those of ordinary skill in the art having the benefit of this disclosure.

Where included, the process engines can be configured to perform calendaring event notification/agenda mismatch management operations. Illustrating by example, in one or more embodiments the one or more processors 702 are operable with the agenda/calendaring event notification mismatch manager 709 to detect a mismatch in starting or ending times occurring between a calendaring event notification and an agenda associated with the calendaring event notification. Additionally, the one or more processors 702 and/or the agenda/calendaring event notification mismatch manager 709 can present a prompt upon the display 404 identifying the mismatch when a mismatch is detected. In one or more embodiments, the prompt presented includes at least one option to remediate the mismatch.

This remediation option could be any of the options described above with reference to FIG. 2, 3, or 6. Others will be obvious to those of ordinary skill in the art having the benefit of this disclosure. For example, in one or more embodiments, the mismatch occurs when the calendaring event notification is created, and the at least one to remediate the mismatch comprises changing a starting time or ending time of one or both of the calendaring event notification or the agenda. In other instances or embodiments, the mismatch occurs when the calendaring event notification is received from another electronic device across a network (105), and the at least one to remediate the mismatch comprises sending a notification to the other electronic device indicating that the mismatch exists.

It is to be understood that FIG. 7 is provided for illustrative purposes only and for illustrating components of one electronic device 101 in accordance with embodiments of the disclosure and is not intended to be a complete schematic diagram of the various components required for an electronic device. Therefore, other electronic devices operable to implement agenda/calendaring event notification mismatch operations in accordance with embodiments of the disclosure may include various other components not shown in FIG. 7, or may include a combination of two or more components or a division of a particular component into two or more separate components, and still be within the scope of the present disclosure.

Figure 8:
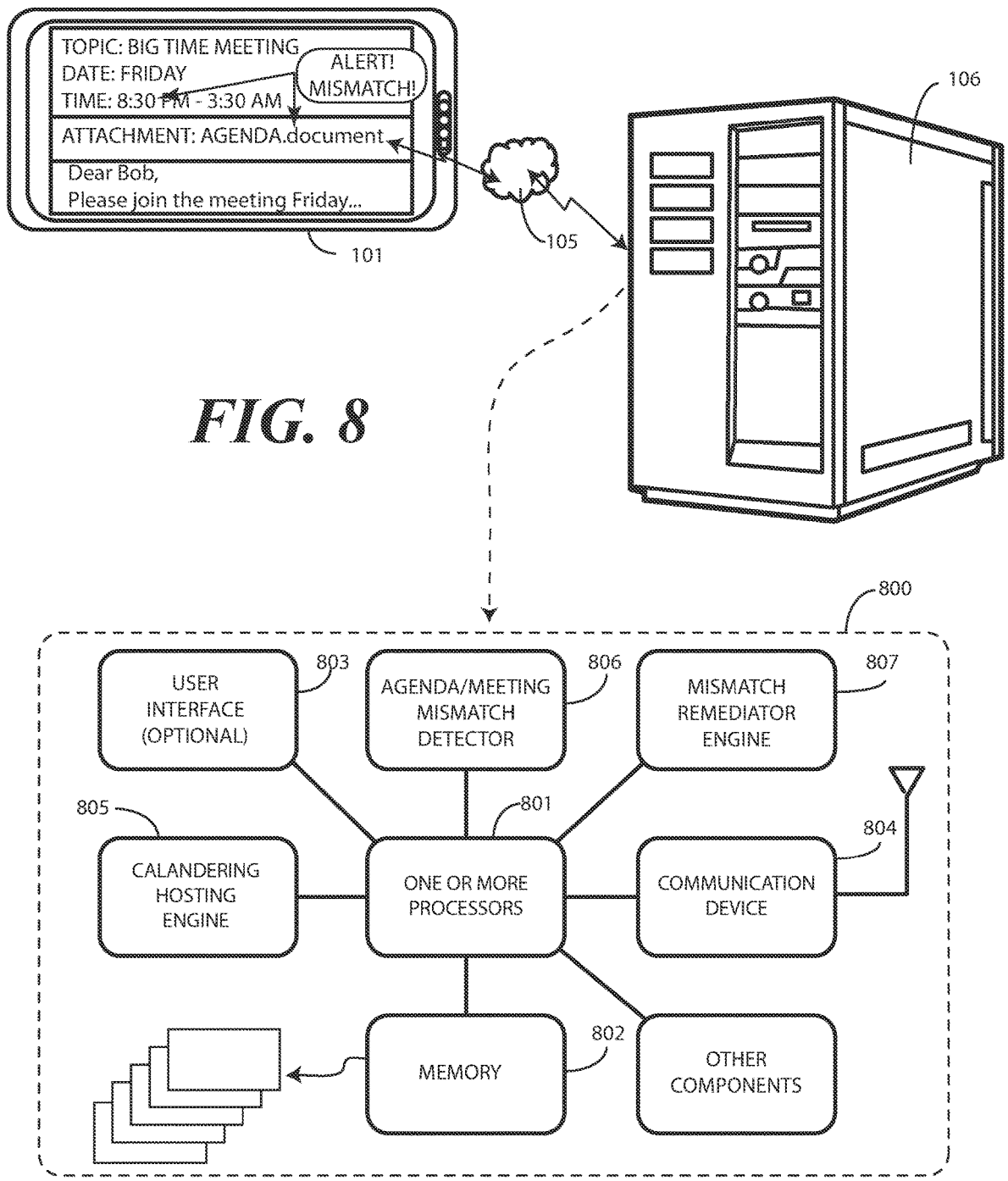
FIG. 8 illustrates one explanatory server complex in accordance with one or more embodiments of the disclosure.

Turning now to FIG. 8, illustrated therein is one explanatory calendaring server 106 configured in accordance with one or more embodiments of the disclosure. In one or more embodiments, the calendaring server 106 can be accessed by one or more electronic devices, e.g., electronic device 101, across a network 105. Illustrating by example, in one or more embodiments the calendaring server 106 can be accessed by either or both of a wide area network and/or a wireless local area network. In one or more embodiments, the electronic device 101 can establish an Internet Protocol electronic communication connection with the calendaring server 106.

An illustrative schematic block diagram 800 is shown in FIG. 8. As with the block diagram schematic (700) of FIG. 7, it is to be understood that the schematic block diagram 800 of FIG. 8 is provided for illustrative purposes only and for illustrating components of one explanatory calendaring server 106 configured in accordance with one or more embodiments of the disclosure. Accordingly, the components shown in either FIG. 7 or FIG. 8 are not intended to be complete schematic diagrams of the various components required for a particular device, as other devices configured in accordance with embodiments of the disclosure may include various other components not shown in FIG. 7 or FIG. 8. Alternatively, other calendaring servers or electronic devices configured in accordance with embodiments of the disclosure or may include a combination of two or more components or a division of a particular component into two or more separate components, and still be within the scope of the present disclosure.

In one or more embodiments the calendaring server 106 can be configured with performing processor-intensive methods, operations, steps, functions, or procedures associated with the maintenance of client calendars, the creation, transmission, acceptance, rejection, and storage of calendaring event notifications, and even the determination of mismatches between agendas attached to, embedded in, or linked to calendaring event notifications. Illustrating by example, the calendaring server 106 can be configured to receive user input from a user interface of an electronic device defining or creating a calendaring event notification and including an agenda, comparing at least one calendaring event bounding time with at least one agenda bounding time, and where there is a mismatch between the at least one calendaring event bounding time and the at least one agenda bounding time, present a prompt at the user interface of the electronic device identifying that the mismatch exists.

In one or more embodiments, the calendaring server 106 includes one or more processors 801, one or more memory devices 802, and one or more user interface devices 803, e.g., a display, a keyboard, a mouse, audio input devices, audio output devices, and alternate visual output devices. The calendaring server 106 also includes a communication device 804. These components can be operatively coupled together such that, for example, the one or more processors 801 are operable with the one or more memory devices 802, the one or more user interface devices 803, and/or the communication device 804 in one or more embodiments.

The one or more processors 801 can include a microprocessor, a group of processing components, one or more ASICs, programmable logic, or other type of processing device. The one or more processors 801 can be configured to process and execute executable software code to perform the various functions of the calendaring server 106.

The one or more memory devices 802 can optionally store the executable software code used by the one or more processors 801 in carrying out the operations of a calendaring system and/or calendaring event notification/agenda mismatch management system. The one or more memory devices 802 may include either or both of static and dynamic memory components. The one or more memory devices 802 can store both embedded software code and user data.

In one or more embodiments, the one or more processors 801 can define one or more process engines. For instance, the software code stored within the one or more memory devices 802 can embody program instructions and methods to operate the various functions of the calendaring server 106, and also to execute software or firmware applications and modules such as a calendaring hosting engine 805, an agenda/calendaring event notification mismatch detection engine 806, and a mismatch remediation engine 807.

Such process engines can be a component of the one or more processors 801, operable with the one or more processors 801, defined by the one or more processors 801, and/or integrated into the one or more processors 801. Other configurations for these engines, including as software or firmware modules operable on the one or more processors 801, will be obvious to those of ordinary skill in the art having the benefit of this disclosure.

Where included, the process engines can be configured to perform electronic or computerized calendar management operations. Illustrating by example, in one or more embodiments the calendaring hosting engine 805 can store and manage client calendars for electronic devices in communication with the calendaring server 106. This can include the creation of calendaring event notifications, the association therewith of agendas by integration, attachment, or linkage, and the transmission, acceptance, rejection, modification, and other management of calendaring event notifications as well.

The agenda/calendaring event notification mismatch detection engine 806 can compare at least one calendaring event bounding time with at least one agenda bounding time present in, attached to, or linked to a calendaring event notification. Where there is a mismatch, the agenda/calendaring event notification mismatch detection engine 806 can present a prompt at a user interface of an electronic device identifying that the mismatch exists. In one or more embodiments, the prompt is presented in response to a calendaring event notification with an agenda mismatch being created. In another embodiment, a prompt is presented upon an electronic device in communication with the calendaring server 106 receiving a calendaring event notification with an agenda mismatch. Of course, a combination of the two approaches could be used as well.

The agenda/calendaring event notification mismatch detection engine 806 can perform other operations as well. For instance, in one or more embodiments the agenda/calendaring event notification mismatch detection engine 806 precludes transmission of a newly created calendaring event notification until an agenda mismatch with that calendaring event notification is corrected. The agenda/calendaring event notification mismatch detection engine 806 can also modify a calendaring event notification to identify the mismatch in addition to presenting the prompt. This modification can include one or more of highlighting text of one or both of the calendaring event notification and/or agenda to identify the mismatch, changing a font of the text of one or more of the calendaring event notification and/or the agenda to identify the mismatch, applying a geometric object circumscribing the text of the calendaring event notification and/or agenda to identify the mismatch, or applying arrows pointing to the text of the calendaring event notification and/or agenda to identify the mismatch.

The mismatch remediation engine 807 can provide at least one option to remediate the mismatch that can be included in the prompt presented by the agenda/calendaring event notification mismatch detection engine 806. For example, the mismatch remediation engine 807 may provide an option for editing one or both of the at least one calendaring event bounding time or the at least one agenda bounding time causing the mismatch. Alternatively, the mismatch remediation engine 807 can provide an option to send an electronic communication to another electronic device from which a mismatched calendaring event notification was received with that electronic communication containing a notification of the mismatch.

Figure 9:
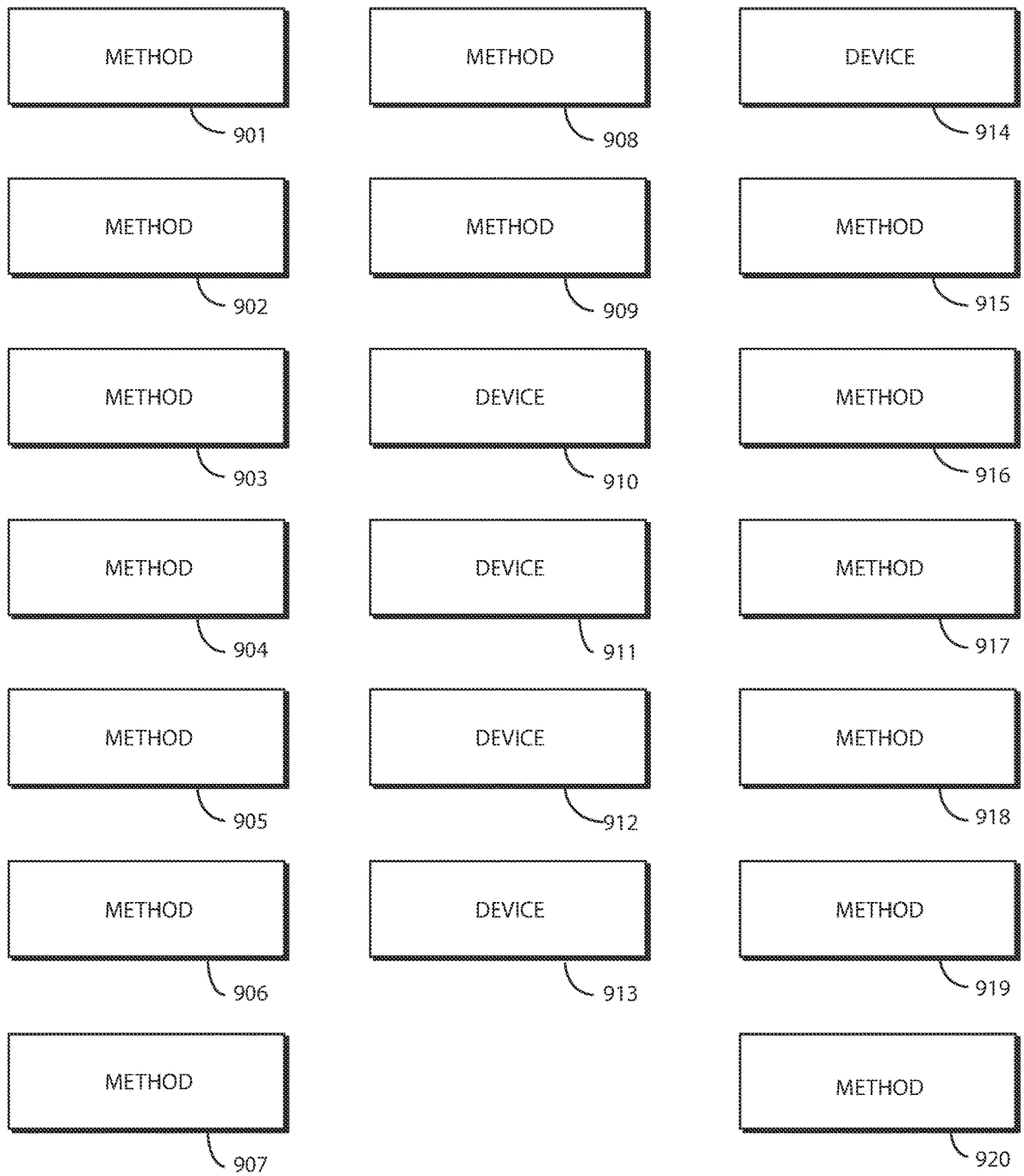
FIG. 9 illustrates various embodiments of the disclosure.

Turning now to FIG. 9, illustrated therein are various embodiments of the disclosure. The embodiments of FIG. 9 are shown as labeled boxes in FIG. 9 due to the fact that the individual components of these embodiments have been illustrated in detail in FIGS. 1-8, which precede FIG. 9. Accordingly, since these items have previously been illustrated and described, their repeated illustration is no longer essential for a proper understanding of these embodiments. Thus, the embodiments are shown as labeled boxes.

At 901, a method in an electronic device comprises detecting, by one or more processors, receipt of user input at a user interface defining a calendaring event notification comprising an agenda. At 901, the method comprises comparing, by the one or more processors, at least one calendaring event bounding time with at least one agenda bounding time. At 901, where there is a mismatch between the at least one calendaring event bounding time and the at least one agenda bounding time, the method comprises presenting, by the one or more processors, a prompt at the user interface identifying that the mismatch exists.

At 902, the prompt of 901 presents at least one remediating option for correcting the mismatch. At 903, the at least one remediating option of 902 comprises editing one or both of the at least one calendaring event bounding time or the at least one agenda bounding time.

At 904, the method of 901 further comprises precluding transmission of the calendaring event notification until the mismatch is corrected. At 905, the method of 901 further comprises modifying the calendaring event notification to identify the mismatch in addition to presenting the prompt.

At 906, the agenda of 901 comprises an attachment attached to the calendaring event notification. At 907, the agenda of 901 is linked to the calendaring event notification by a hyperlink. At 908, the detecting of 901 comprises parsing one or both of a subject heading or a body of the calendaring event notification to determine whether the agenda is defined by the body of the calendaring event, attached to the calendaring event notification as an attachment, or linked to the calendaring event notification by a hyperlink.

At 909, the at least one calendaring event bounding time of 901 comprises one or both of a calendaring event commencement time or a calendaring event conclusion time. At 909, the at least one agenda bounding time of 901 comprises one or both of an agenda commencement time or an agenda conclusion time.

At 910, an electronic device comprises a display and one or more processors operable with the display and a calendaring application. At 910, the one or more processors detect a mismatch in starting or ending times occurring between a calendaring event notification and an agenda associated with the calendaring event notification and present a prompt upon the display identifying the mismatch when the mismatch is detected. At 914, the one or more processors of 910 reside in a calendaring server in communication with the electronic device across a network.

At 911, the prompt of 910 comprises at least one option to remediate the mismatch. At 912, the mismatch of 911 occurs when the calendaring event notification is created and the at least one option to remediate the mismatch comprises changing a starting time or ending time of one or both of the calendaring event notification or the agenda. At 913, the mismatch of 911 occurs when the calendaring event notification is received from another electronic device across a network and the at least one option to remediate the mismatch comprises sending a notification to the another electronic device indicating that the mismatch exists.

At 915, a method in an electronic device comprises detecting, by one or more processors, receipt of a calendaring event notification comprising an agenda from another electronic device across a network. At 915, the method comprises comparing, by the one or more processors, at least one calendaring event bounding time with at least one agenda bounding time. At 915, where there is a mismatch between the at least one calendaring event bounding time and the at least one agenda bounding time, the method comprises presenting, by the one or more processors, a prompt at a user interface of the electronic device identifying that the mismatch exists.

At 916, the prompt of 915 prompt presents at least one remediating option for correcting the mismatch. At 917, the at least one remediating option of 916 comprises editing one or both of the at least one calendaring event bounding time or the at least one agenda bounding time. AT 918, the at least one remediating option of 916 comprises sending an electronic communication to the other electronic device across the network, with the electronic communication comprising a notification of the mismatch.

At 919, the method of 915 further comprises modifying the calendaring event notification to identify the mismatch. At 920, the modification of 919 comprises one or more of highlighting text to identify the mismatch, changing a font of the text to identify the mismatch, applying a geometric object circumscribing the text to identify the mismatch, or applying arrows pointing to the text to identify the mismatch.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   detecting, by one or more processors, receipt of user input at a user interface defining a calendaring event notification comprising an agenda, wherein the calendaring event notification contains at least one calendaring event bounding time and the agenda contains at least one agenda bounding time;
   comparing, by the one or more processors, the at least one calendaring event bounding time with the at least one agenda bounding time; and
   where there is a mismatch between the at least one calendaring event bounding time and the at least one agenda bounding time, presenting, by the one or more processors, a prompt at the user interface identifying that the mismatch exists;
   wherein:
   the prompt presents at least one remediating option for correcting the mismatch;
   the prompt requests what events should occur during gaps defined by the mismatch between the at least one calendaring event bounding time and the at least one agenda bounding time;
   the calendaring event notification comprises a prior calendaring event notification from a recurring event that has been edited by the user input to create the calendaring event notification and the mismatch;
   the calendaring event notification comprises a calendaring event information section that is visibly delineated from an event agenda section;
   the prompt is presented atop either the calendaring event information section or both the calendaring event information section and the event agenda section; and
   arrows point from the prompt to the mismatch; and
   further comprising modifying the calendaring event notification to identify the mismatch in addition to presenting the prompt.

2. The method of claim 1, wherein:
   the at least one calendaring event bounding time consists of a calendaring event start time and a calendaring event stop time;
   the at least one agenda bounding time comprises an agenda start time and an agenda stop time;
   the calendaring event information section denotes the calendaring event start time and the calendaring event stop time;
   the event agenda section denotes the agenda start time and the agenda stop time; and
   the prompt results in the calendaring event start time, the calendaring event stop time, the agenda start time, and the agenda stop time being presented in a font that is different from a remainder of information presented in the calendaring event information section and from another remainder of other information presented in the event agenda section.

3. The method of claim 2, wherein:
   the prompt spans a visible boundary demarcating the calendaring event information section and the event agenda section.

4. The method of claim 3, wherein:
   the at least one remediating option comprises a user actuation target allowing the calendaring event notification to be edited; and
   the prompt comprises another user actuation target that, when actuated, causes the calendaring event notification to be transmitted; and
   further comprising precluding transmission of the calendaring event notification until either the user actuation target allowing the calendaring event notification to be edited is actuated or the another user actuation target that, when actuated, sends the calendaring event notification included with the prompt is actuated to override transmission preclusion of the calendaring event notification.

5. The method of claim 1, further comprising precluding transmission of
the calendaring event notification the calendaring event notification until the mismatch is corrected.

6. The method of claim 1, wherein
the agenda comprises a hyperlink embedded in the calendaring event information section with the hyperlink referring to a separate file and system where the agenda is stored.

7. The method of claim 1, wherein
the agenda is attached as a file and is identified by a file attachment section.

8. The method of claim 1, wherein:
the one or more processors send an electronic communication identifying the mismatch between the at least one calendaring event bounding time and the at least one agenda bounding time to other electronic devices associated with participants identified by the agenda concurrently with presentation of the prompt.

9. The method of claim 1, wherein:
the one or more processors send an electronic communication identifying the mismatch between the at least one calendaring event bounding time and the at least one agenda bounding time to other electronic devices associated with participants identified by the agenda; and
the prompt comprises a user actuation target that.

10. An electronic device, comprising:
a display; and
one or more processors operable with the display and a calendaring application;
the one or more processors detecting a mismatch in starting or ending times occurring between a calendaring event notification and an agenda defined by a body of the calendaring event notification, attached to the calendaring event notification, or linked to the calendaring event notification by a hyperlink, and presenting a prompt upon the display identifying the mismatch when the mismatch is detected;
the prompt comprising at least one option to remediate the mismatch and presenting a circle or square circumscribing text of the calendaring event notification identifying the mismatch; and
wherein:
the calendaring event notification comprises a calendaring event information section that is visibly delineated from an event agenda section by a linear boundary;
the prompt is superimposed upon the calendaring event notification and spans the linear boundary; and
the at least one option to remediate the mismatch comprises a user actuation target allowing the calendaring event notification to be edited and another user actuation target that, when actuated, causes the calendaring event notification to be transmitted; and
the one or more processors transmitting the calendaring event notification without the mismatch being corrected when no agenda is attached to the calendaring event notification and the another user actuation target is actuated.

11. The electronic device of claim 10, wherein:
the at least one calendaring event bounding time consists of a calendaring event start time and a calendaring event stop time; and
at least one agenda bounding time comprises an agenda start time and an agenda stop time.

12. The electronic device of claim 10, wherein
the prompt spans the linear boundary.

13. The electronic device of claim 10, wherein the one or more processors reside in a calendaring server in communication with the electronic device across a network.

14. The electronic device of claim 10, wherein
the at least one option to remediate the mismatch further comprises an addition of a note indicating that the mismatch is intentional.

15. A method in an electronic device, the method comprising:
detecting, by one or more processors, receipt of a calendaring event notification comprising an agenda attached to the calendaring event notification from another electronic device across a network;
comparing, by the one or more processors, at least one calendaring event bounding time with at least one agenda bounding time;
where there is a mismatch between the at least one calendaring event bounding time and the at least one agenda bounding time, presenting, by the one or more processors, a prompt at a user interface of the electronic device identifying that the mismatch exists; and
modifying the calendaring event notification to identify the mismatch; and
further comprising parsing a subject heading of the calendaring event notification to determine the mismatch;
wherein:
the modifying the calendaring event notification to identify the mismatch comprises applying arrows pointing from a superimposed mismatch notification to text of the calendaring event notification to identify the mismatch, with tails of the arrows defining a V-shape;
the calendaring event notification comprises a calendaring event information section that is visibly delineated from an event agenda section by a horizontal line;
the calendaring event information section consists essentially of a calendaring event topic, a calendaring event date, a calendaring event start time, and a calendaring event stop time;
the event agenda section comprises the an agenda start time and an agenda stop time; and
the modifying the calendar event notification comprises applying the arrows such that they point to the calendaring event start time and the agenda start time, the calendaring event stop time and the agenda stop time, or both, to identify the mismatch.

16. The method of claim 15, further comprising:
sending an electronic communication identifying the mismatch between the at least one calendaring event bounding time and the at least one agenda bounding time to other electronic devices associated with participants identified by the agenda;
wherein:
the electronic communication comprises at least one remediating option for correcting the mismatch; and
the at least one remediating option for correcting the mismatch allows a receiving electronic device of the electronic communication to adjust the at least one calendaring event bounding time stored at the receiving electronic device to only those times where an owner of the receiving electronic device is required by the agenda to be in attendance.

17. The method of claim 16, wherein:
the prompt provides an auto correct feature allowing an automatic adjustment of one or both of the at least one calendaring event bounding time or the at least one agenda bounding time.

18. The method of claim 16, wherein the prompt presents a question asking which of the mismatch between the calendaring event start time and the agenda start time, the calendaring event stop time and the agenda stop time, or both, should be corrected.

19. The method of claim 15, wherein the agenda comprises an attachment attached to the calendaring event notification.

20. The method of claim 19, wherein the agenda is linked to the calendaring event notification by a hyperlink.

* * * * *